US009250857B2

United States Patent
Dawson et al.

(10) Patent No.: US 9,250,857 B2
(45) Date of Patent: *Feb. 2, 2016

(54) OPTIMIZATION OF NATIVE BUFFER ACCESSES IN JAVA APPLICATIONS ON HYBRID SYSTEMS

(71) Applicant: International Business Machines Corporation, Armonk, NY (US)

(72) Inventors: Michael H. Dawson, Ontario (CA); Yuqing Gao, Mount Kisco, NY (US); Megumi Ito, Kanagawa-ken (JP); Graeme Johnson, Ontario (CA); Seetharami R. Seelam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 14/012,325

(22) Filed: Aug. 28, 2013

(65) Prior Publication Data

US 2014/0189171 A1    Jul. 3, 2014

Related U.S. Application Data

(63) Continuation of application No. 13/732,820, filed on Jan. 2, 2013.

(51) Int. Cl.
*G06F 12/00* (2006.01)
*G06F 13/00* (2006.01)
(Continued)

(52) U.S. Cl.
CPC ............... *G06F 5/08* (2013.01); *G06F 3/0685* (2013.01); *G06F 9/544* (2013.01); *G06F 9/545* (2013.01); *G06F 11/34* (2013.01)

(58) Field of Classification Search
CPC .................................. G06F 5/08; G06F 11/34
See application file for complete search history.

(56) References Cited

U.S. PATENT DOCUMENTS

| 7,333,451 B1 * | 2/2008 | Khalil | H04L 29/06 370/331 |
| 2005/0204360 A1 * | 9/2005 | Meleshchuk | G06F 9/544 719/314 |

(Continued)

OTHER PUBLICATIONS

Stimulating Shared Buffer Communication in a Distributed Processing Environment NN9204340, IBM Technical Disclosure Bulletin, vol. 34, iss. 11, Apr. 1, 1992 (13 pages).*

(Continued)

*Primary Examiner* — Sanjiv Shah
*Assistant Examiner* — Daniel C Chappell
(74) *Attorney, Agent, or Firm* — Scully, Scott, Murphy & Presser, P.C.; Louis J. Percello, Esq.

(57) ABSTRACT

Managing buffers in a hybrid system, in one aspect, may comprise selecting a first buffer management method from a plurality of buffer management methods; capturing statistics associated with access to the buffer in the hybrid system running under the initial buffer management method; analyzing the captured statistics; identifying a second buffer management method based on the analyzed captured statistics; determining whether the second buffer management method is more optimal than the first buffer management method; in response to determining that the second buffer management method is more optimal than the first buffer management method, invoking the second buffer management method; and repeating the capturing, the analyzing, the identifying and the determining.

15 Claims, 7 Drawing Sheets

(51) Int. Cl.
   *G06F 13/28*   (2006.01)
   *G06F 5/08*    (2006.01)
   *G06F 3/06*    (2006.01)
   *G06F 9/54*    (2006.01)
   *G06F 11/34*   (2006.01)

(56) References Cited

U.S. PATENT DOCUMENTS

| | | | | |
|---|---|---|---|---|
| 2006/0093317 | A1* | 5/2006 | Law | G09G 5/008 386/343 |
| 2006/0143396 | A1* | 6/2006 | Cabot | G06F 12/121 711/134 |
| 2008/0172662 | A1* | 7/2008 | Harris | G06F 8/443 717/159 |
| 2009/0182951 | A1* | 7/2009 | Matick | G06F 12/122 711/134 |
| 2009/0319600 | A1* | 12/2009 | Sedan | G06F 11/0766 709/203 |
| 2010/0088490 | A1* | 4/2010 | Chakradhar | G06F 8/45 712/34 |
| 2010/0315960 | A1* | 12/2010 | Li | H04L 43/00 370/252 |
| 2011/0173155 | A1* | 7/2011 | Becchi | G06F 9/5044 707/610 |
| 2013/0191848 | A1* | 7/2013 | Chapman | G06F 9/5027 719/312 |
| 2014/0189171 | A1* | 7/2014 | Dawson | G06F 3/0685 710/56 |
| 2014/0189385 | A1* | 7/2014 | Gorbatov | G06F 1/3234 713/320 |
| 2014/0281264 | A1* | 9/2014 | Duluk, Jr. | G06F 12/08 711/135 |

OTHER PUBLICATIONS

Distributed Computing Environment Application Enabler for OS/2 Cell Directory Client Cache NN9506151, IBM Technical Disclosure Bulletin, vol. 38, iss. 6, Jun. 1, 1995 (2 pages).*

ARC: A Self-Tuning, Low Overhead Replacement Cache, Megiddo et al, Proceedings of FAST '03: 2nd USENIX Conference on File and Storage Technologies, Mar. 31, 2003-Apr. 2, 2003 (17 pages).*

"Stimulating Shared Buffer Communication in a Distributed Processing Environment" NN9204340, IBM Technical Disclosure Bulletin (Apr. 1, 1992) 13 pages, vol. 34, issue 11.

"Distributed Computing Environment Application Enabler for OS/2 Cell Directory Client Cache" NN9506151, IBM Technical Disclosure Bulletin (Jun. 1, 1995) 2 pages, vol. 38, issue 6.

Megiddo et al., "ARC: A Self-Tuning, Low Overhead Replacement Cache" Proceedings of FAST '03: 2nd USENIX Conference on File and Storage Technologies (Mar. 31, 2003-Apr. 2, 2003), San Francisco, CA, 17 pages.

Office Action dated Dec. 11, 2014 received in the parent U.S. Appl. No. 13/732,820.

U.S. Appl. No. 13/417,878, entitled, "Preferential Execution of Method Calls in Hybrid Systems", filed Mar. 12, 2012, First Named Inventor: Michael H. Dawson.

U.S. Appl. No. 13,437,506, entitled, "Identification of Localizable Function Calls", filed Apr. 2, 2012, First Named Inventor: Michael H. Dawson.

"HAS model", http://www.garret.ru/has.html, printed on Dec. 7, 2012, pp. 1-6.

Protic, J., et al., "Distributed Shared Memory: Concepts and Systems", IEEE Computer Society, Summer 1996, pp. 63-79.

Stumm, M., et al., "Algorithms Implementing Distributed Shared Memory", Journal Computer, May 1990, vol. 23 Issue 5, pp. 54-64.

* cited by examiner

OPTIMIZATION OF NATIVE BUFFER ACCESSES IN JAVA APPLICATIONS ON HYBRID SYSTEMS

CROSS-REFERENCE TO RELATED APPLICATIONS

This application is a continuation of U.S. Ser. No. 13/732,820, filed on Jan. 2, 2013, the entire content and disclosure of which is incorporated herein by reference.

FIELD

The present application relates generally to computers, and computer applications, and more particularly to managing buffers in a hybrid system.

BACKGROUND

Java Virtual Machine (JVM) implementations support the Java Native Interface (JNI) as a mechanism which allows Java code to call methods written in C and C++(native code) and vice verse. Traditionally both the code written in Java and the native code is executed in the same process and by the same thread as execution transitions between the two.

It is possible, however, to construct a JVM such that the native code is run in one or more Remote Execution Containers which may be hosted in separate processes on the same or different machines from where the Java code is executed such that the native code is unaware that it is executing separately from the JVM. This separation prevents misbehaved native code from destabilizing the JVM and enables running the native code in a different environment (e.g., security context, bit width) than the main JVM.

In a split JVM, the cost of the calls between Java and native code has much greater overhead and latency resulting in the need to reduce round-trips where possible. With the standardized Java Native Interface (JNI), an application often has to make multiple calls to get the information needed to complete an action. In a traditional JVM, the overhead for a JNI to Java call is low enough to be acceptable. In the case of a distributed JVM, however, the latency of making a cross-process/cross-machine call may be magnitudes of order greater than required to run the method called. The JNI calls that are of particular focus are the ones associated with native buffers.

In one example use case, JVM Proxy technology can be used to realize the true potential of hybrid systems with transparent acceleration of Java workload running on a main machine (host) by running Java methods on another machine (accelerator) while leaving required native methods run on the main machine. When a native buffer is accessed from both Java and native methods, accessing the buffer from remote machine will cause a network round-trip overhead.

For instance, ByteBuffer instances, created by a call to static ByteBuffer java.nio.ByteBuffer.allocateDirect(int nbyte), create regions of non-heap memory which can be shared between native and managed code. Briefly, ByteBuffer is a Java™ class that defines input/output (I/O) operations upon byte buffers. Native code refers to code written in machine language or the like that can be executed on a native machine. Managed code refers to code written in language that requires another program to run it. Typically single address is used for the buffer in native and managed space: JVM on a single machine. In the hybrid environment, Java and native (JNI) code run on different machines. For example, native code running on the host machine could allocate a virtual address. Now the managed code on the accelerator machine will have to reach out to the host machine for two kinds of operations: to read and write the data at that address and to respond to address look up requests. This naïve allocation of direct byte buffers on the JNI-side (host-side) makes accesses expensive for some cases. Excessive roundtrips for data make this approach non-usable for real applications in which slowdowns have been observed in excesses of 50 times.

BRIEF SUMMARY

A method for managing a buffer in a hybrid system, in aspect, may comprise selecting a first buffer management method from a plurality of buffer management methods. The method may also comprise capturing statistics associated with access to the buffer in the hybrid system running under the initial buffer management method. The method may further comprise analyzing the captured statistics. The method may also comprise identifying a second buffer management method based on the analyzed captured statistics. The method may also comprise determining whether the second buffer management method is more optimal than the first buffer management method. The method may further comprise in response to determining that the second buffer management method is more optimal than the first buffer management method, invoking the second buffer management method. The method may also comprise repeating the capturing, the analyzing, the identifying and the determining.

A system managing a memory buffer, in one aspect, may comprise a hybrid system comprising at least a first machine running a native code and a second machine running a managed code. A module may be operable to run on the hybrid system and further operable to select a first buffer management method from a plurality of buffer management methods, capture statistics associated with access to the buffer in the hybrid system running under the initial buffer management method, analyze the captured statistics, identify a second buffer management method based on the analyzed captured statistics, and determine whether the second buffer management method is more optimal than the first buffer management method, the module further operable, in response to determining that the second buffer management method is more optimal than the first buffer management method, to invoke the second buffer management method.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A hybrid system in the present disclosure refers to a heterogeneous distributed system that contains both general and special-purpose computing platforms. One example is the IBM®zEnterprise system, from International Business Machines Corporation, Armonk, N.Y., which includes system Z, X86 and Power7 blades. Since hybrid systems could serve as a flexible platform for optimizing workload in terms of performance/price ratio, more and more applications could benefit from running in hybrid systems.

A methodology of the present disclosure in one embodiment enables dynamic transfer of native buffers between machines so that both sides can get native-speed access to buffers with minimized round-trips. In one aspect, a fast access to native buffers shared between separate nodes may be achieved by enabling transfer of native buffers between nodes or machines on-demand by leveraging memory protection and controlling in buffer.

In one aspect, a methodology of the present disclosure may reserve a region of free address space at the same or different virtual address in each node. When a new native buffer is requested, the methodology of the present disclosure may allocate a new buffer within the reserved region on one node and mark the other node at the same virtual address with guard pages. Briefly, a guard page provides an alarm for memory page access. If the buffer size is large enough, the methodology of the present disclosure may allocate it to dedicated pages. If the buffer size is small, the methodology of the present disclosure may allocate it to a page shared with other buffers. If an access to the buffer with guard pages is attempted and as a result a signal is generated, the methodology of the present disclosure may handle the signal by migrating the buffer from the original node to the accessed node, marking the original side with guard pages then resuming. If a buffer is signaled to be migrated to the other node, the methodology of the present disclosure in one embodiment may migrate all buffers together which share pages with the signaled buffer.

Figure 5A:
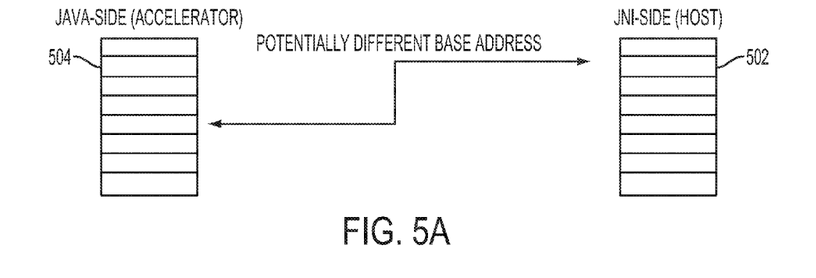
FIGS. 5A-5C illustrate memory buffers allocated based on a DBB method in one embodiment of the present disclosure.

As a particular example, the methodology of the present disclosure in one embodiment may enable transfer of ByteBuffer storage or the like between the accelerator and the host on-demand by leveraging large 64-bit address space and memory protection. Referring to FIG. 5A, at JVM startup, the methodology of the present disclosure in one embodiment may negotiate and reserve a free address space region each on host-side 502 and accelerator-side 504 at the same or different virtual address.

When an application allocates a direct ByteBuffer by ByteBuffer.allocateDirect( ) or the like, the methodology of the present disclosure in one embodiment may allocate a new buffer on the accelerator-side and mark host-side with guard pages. The accelerator-side now has high-speed access to the buffer. For example, referring to FIG. 5B, when allocating a direct ByteBuffer by ByteBuffer.allocateDirect( ) a new buffer 506 may be allocated on the accelerator-side (green) and host-side may be marked with guard pages (red) 508. Java code on the accelerator now has high-speed access to the buffer. In the examples, a host (host machine) runs a native code and the accelerator (or another machine) runs a managed code (e.g., Java™ code).

Figure 5B:
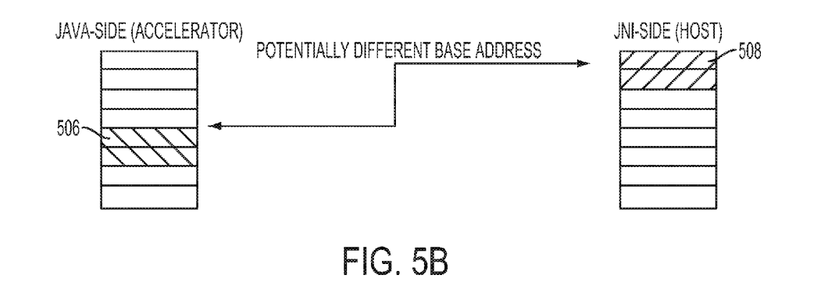

When the host-side attempts to access the buffer with guard pages, a signal will be generated, for example, by memory management processing. The methodology of the present disclosure in one embodiment may handle the signal by migrating the buffer to the host-side, marking the accelerator-side with guard pages, then resuming. The methodology of the present disclosure in one embodiment migrates back the buffer to the accelerator-side if the accelerator-side accesses the buffer.

Figure 5C:
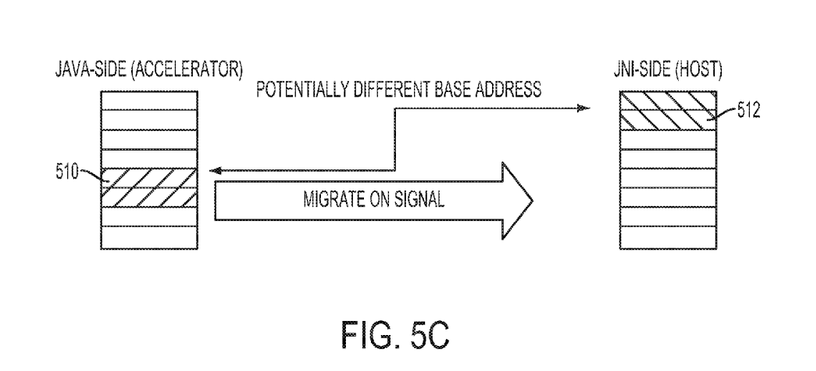

FIG. 5C shows an example of migrating on signal. If native access to the buffer 510 is required, a read/write to the guard page will generate a signal. The methodology of the present disclosure in one embodiment may handle the signal by migrating data to the buffer 512 host-side, marking Java-side with guard pages 510, and resume. The methodology of the present disclosure in one embodiment may migrate back to accelerator-side if Java access to the buffer is required.

Figure 6:
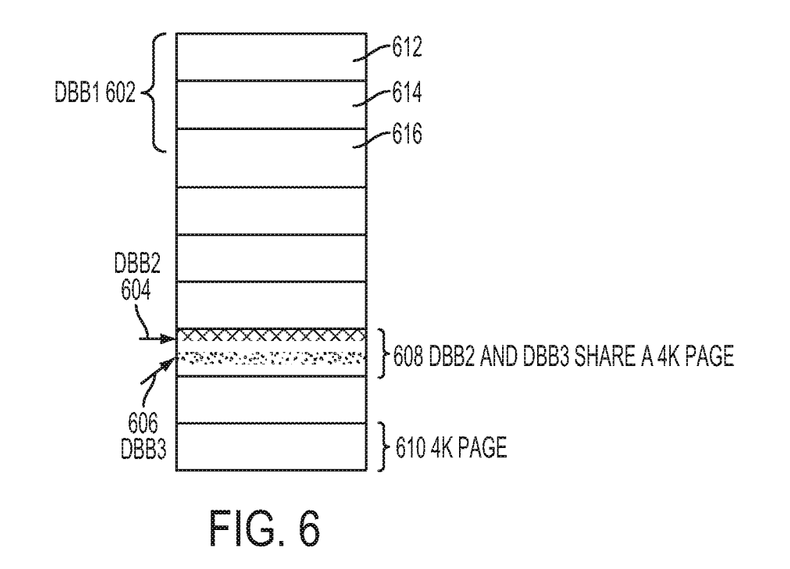
FIG. 6 illustrates allocation of memory for buffer management in one embodiment of the present disclosure.

For some buffers, Java code may control allocation. In those cases, the methodology of the present disclosure in one embodiment may optimize to avoid sharing issues. In one aspect, referring to FIG. 6, to avoid false sharing of pages by multiple buffers and waste of pages by small buffers, the methodology of the present disclosure may allocate large native buffers (for example, buffers larger than 2K for a 4K page 610) to dedicated pages, and small native buffers to shared pages. For example, buffers larger than 2K may be assigned 4K dedicated pages and other buffers do not share these pages. If the buffers are smaller than 2K, they may be allocated to shared 4K pages and other buffers may share these pages. For example DBB1 602, which occupies 2.5 pages is assigned dedicated 4K pages 612, 614, and 616. DBB2 604 and DBB3 606 that require less than half page are both assigned to shared 4K page 608. If false sharing is detected on a page that contains small buffers, the methodology of the present disclosure in one embodiment may keep the page on one side (on accelerator-side or host side) and perform a remote access from the other side. If a buffer is signaled to be migrated to the other side, the methodology of the present disclosure in one embodiment may migrate all buffers which share pages with the signaled buffer.

A profile-guided allocation may be performed to decide on which side the methodology of the present disclosure should allocate a new buffer. If it can be detected from sampling data that a native buffer allocated at the specific context is mostly accessed from one side and rarely accessed from the other side, the methodology of the present disclosure may next time allocate a new native buffer on the mostly accessed side. The methodology of the present disclosure may keep the buffer on the allocated side and perform remote accesses if the number of accesses from the other side is small enough, buffers are small, or only a few elements of the buffer are accesses, or combinations thereof, such that the migration overhead is larger than the remote access overhead.

In another aspect, two addresses may be managed for a buffer: one on the host side and another on the accelerator side. A JVM may use the Java side buffer address to satisfy data requests. The JVM may use host side buffer addresses if the buffer address is requested by a JNI.

In one embodiment, the methodology of the present disclosure may migrate a buffer if GetDirectBufferAddress is called from the guarded side, because it is highly expected that access to the buffer follows after GetDirectBufferAddress. If GetDirectBufferAddress is called from an accelerator machine, and the corresponding native buffer is on the host machine, the methodology of the present disclosure may migrate the buffer when GetDirectBufferAddress returns. If GetDirectBufferAddress is called from the host machine and the corresponding native buffer is on the accelerator machine, the methodology of the present disclosure may migrate the buffer from the accelerator machine to the host machine. Profiled data on which native functions access the buffer after GetDirectBufferAddress will help avoid mis-migration.

A similar technique may be used if memory allocated through JNI if memory happens to be page aligned and the space is free on the other side. In this case, same address can be reserved on both sides and the data is migrated only for data requests but address requests are satisfied without any data migration. An API may be provided for applications to use such that memory can be allocated for direct byte buffers in a way that works as outlined. A middleware such as a web application server (WAS) may use this API to allocate its direct byte buffers.

As discussed above, all buffers might not be as big as a page. As such, multiple buffers may share a page, and/or a page could be shared by an object not related to JNI and Java. In another aspect, some buffers may spill into multiple pages. For instance, parts of the buffers (head and tail) may share a page with other objects. In yet another aspect, not all buffers may have similar access patterns. For instance, native machine or code may fill the buffer once, and a Java™ side may access the contents of the buffer, vice versa. Native and Java sides may access the buffer alternatively. One side may access the buffer in small chunks, the other side may perform a bulk access.

A methodology in one embodiment of the present disclosure may collect statistics on buffer accesses to identify cases suitable for allocating a buffer on the native or Java side, or managing two addresses. The statistics may include but are not limited to, size of the buffer, mapping of the buffer on native and Java side, access patterns to the buffer on the Java side (e.g., small byte at a time accesses vs. multi-byte accesses), back and forth shipping of buffer due to true sharing of data, due to false sharing of data on either native side or Java side, e.g., as in an object that shares a page with other non-related objects.

The statistics may be used for buffer management. For instance, a buffer that is full-page size may be allocated to dedicated pages on Java side. This may eliminate false sharing on Java side. With buffers that span over multiple pages, full page portions may be implemented with two address schema while the head and tail parts of the buffer may be co-located with other objects.

Figure 1:
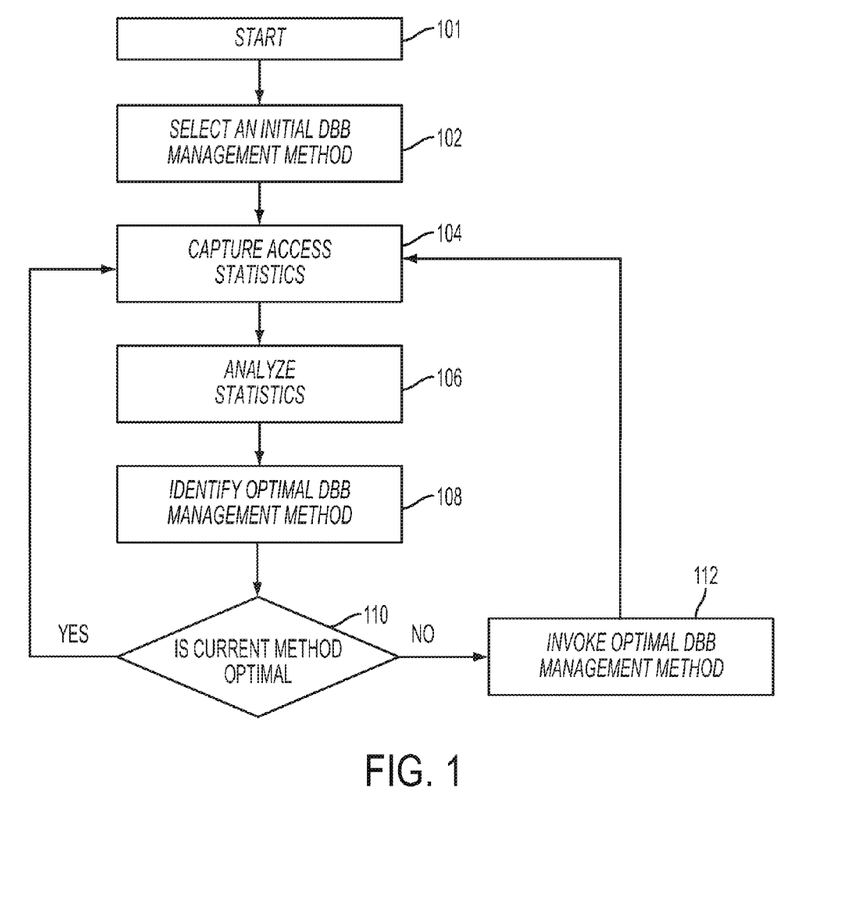
FIG. 1 is a flow diagram illustrating a method for shared buffer optimization in one embodiment of the present disclosure.

FIG. 1 is a flow diagram illustrating a method for shared buffer optimization in one embodiment of the present disclosure. At 101, a logic of the method starts. This can be started on the host side or the accelerator side. At 102, an initial (also referred to as a first) DBB management method is selected. The initial method is invoked and the operation of the hybrid system utilizing the selected method is observed. For instance, at 104, data associated with statistics on the access to a buffer being considered is captured. At 106, the captured statistics is analyzed. At 108, based on the analysis, an optimal (also referred to as a second) DBB management method is identified. At 110, it is determined whether the currently used method is optimal, e.g., more optimal than the identified DBB method at 108. If so, the logic continues to 104 where more of the statistics on the buffer access are captured. If the current method is determined as not as optimal, e.g., the identified method is more optimal, at 112, the identified DBB management method is invoked. The logic returns to 104 where the capturing of the access statistics continues, in which the access statistics is now captured of the system running under the newly identified method.

Figure 2:
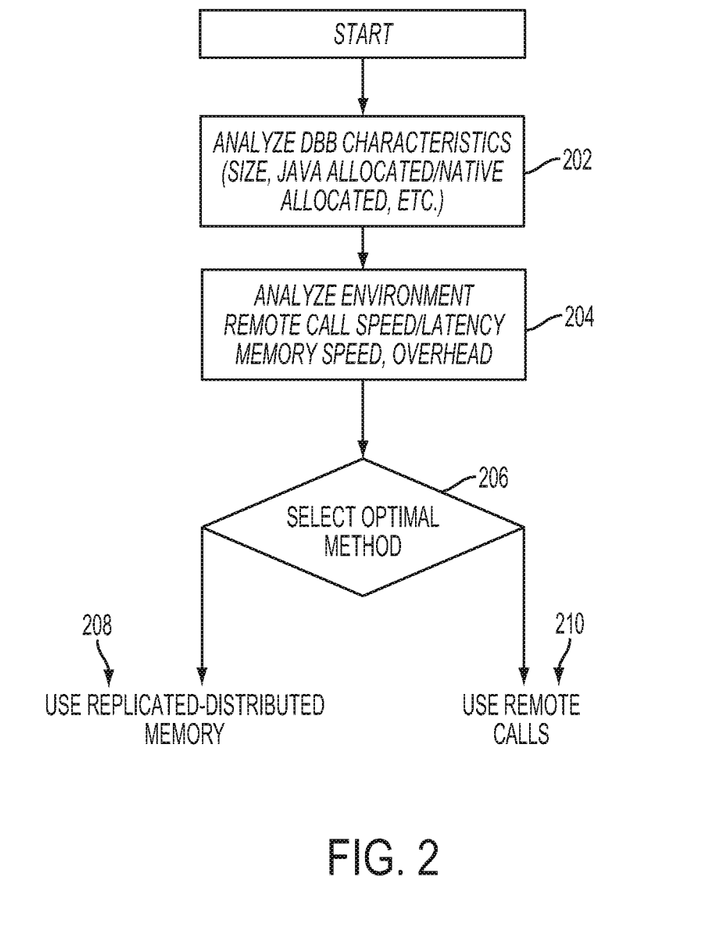
FIG. 2 is a flow diagram illustrating a method of selecting an initial direct byte buffer (DBB) method in one embodiment of the disclosure.

FIG. 2 is a flow diagram illustrating a method of selecting an initial DBB method (e.g., shown at 102 in FIG. 1) in one embodiment of the disclosure. At 202, DBB characteristics are analyzed. For example, information such as the size of the buffer, where the buffer is allocated, e.g., Java side (accelerator) or native side (host), amount accessed, frequency of access is evaluated. At 204, the computing environment information associated with the hybrid system is analyzed. For instance, information associated with remote call speed or latency, memory access speed, overhead and others, is evaluated. Based on the analysis performed at 202 and 204, optimal method may be selected at 206. For instance, an optimal method may be using the above-described scheme (referred to herein as replicated-distributed memory) at 208, or allocating a buffer on one side and using remote calls to access the buffer 210.

Figure 3:
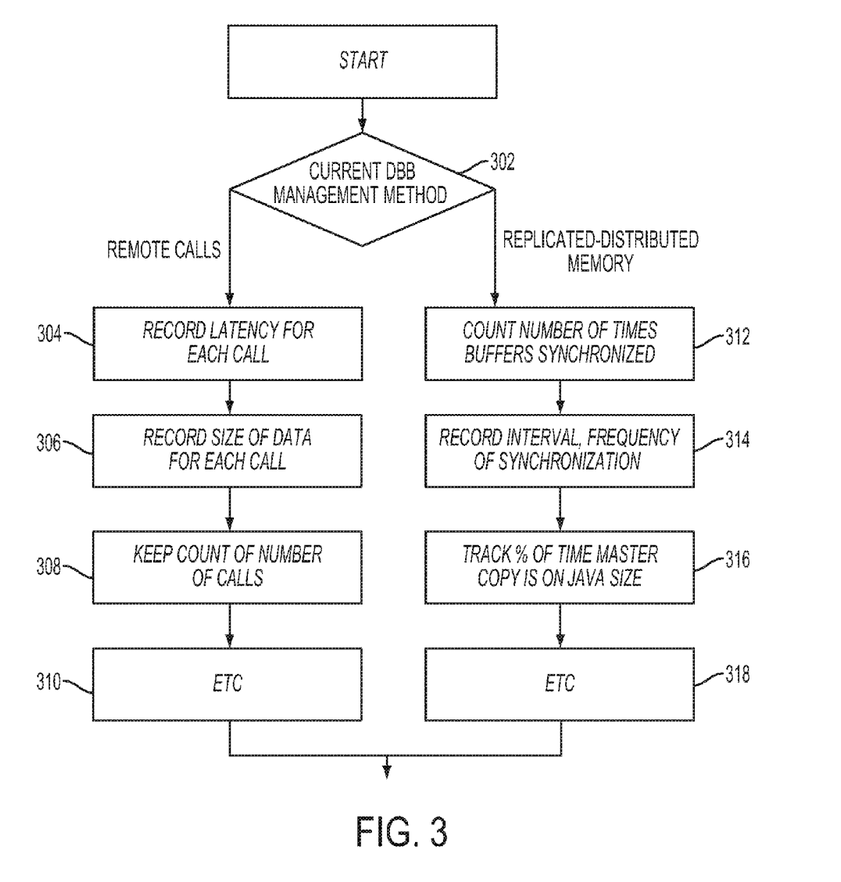
FIG. 3 is a flow diagram illustrating a method of capturing or collecting access statistics in one embodiment of the present disclosure.

FIG. 3 is a flow diagram illustrating a method of capturing or collecting access statistics (e.g., shown at 104 in FIG. 1) in one embodiment of the present disclosure. At 302, the current DBB management method is identified, for instance, by looking up which method the hybrid system is running currently. If the system is running under a remote call method, at 304, latency for each call (access to the buffer) may be recorded. At 306, the size of data involved in each call may be recorded. At 308, the count of number of calls that access the remote buffer(s) are kept and accumulated. At 310, additional data may be monitored and recorded.

If the current DBB management method the hybrid system is using is the replicated-distributed memory method, at 312, the number of times the buffers are synchronized is accumulated and the count is maintained. At 314, time interval and frequency of synchronization (data transfer) are recorded. At 316, the percentage of time (or like statistics) a master copy is allocated to Java side is tracked. At 318, other information may be collected.

Figure 4:
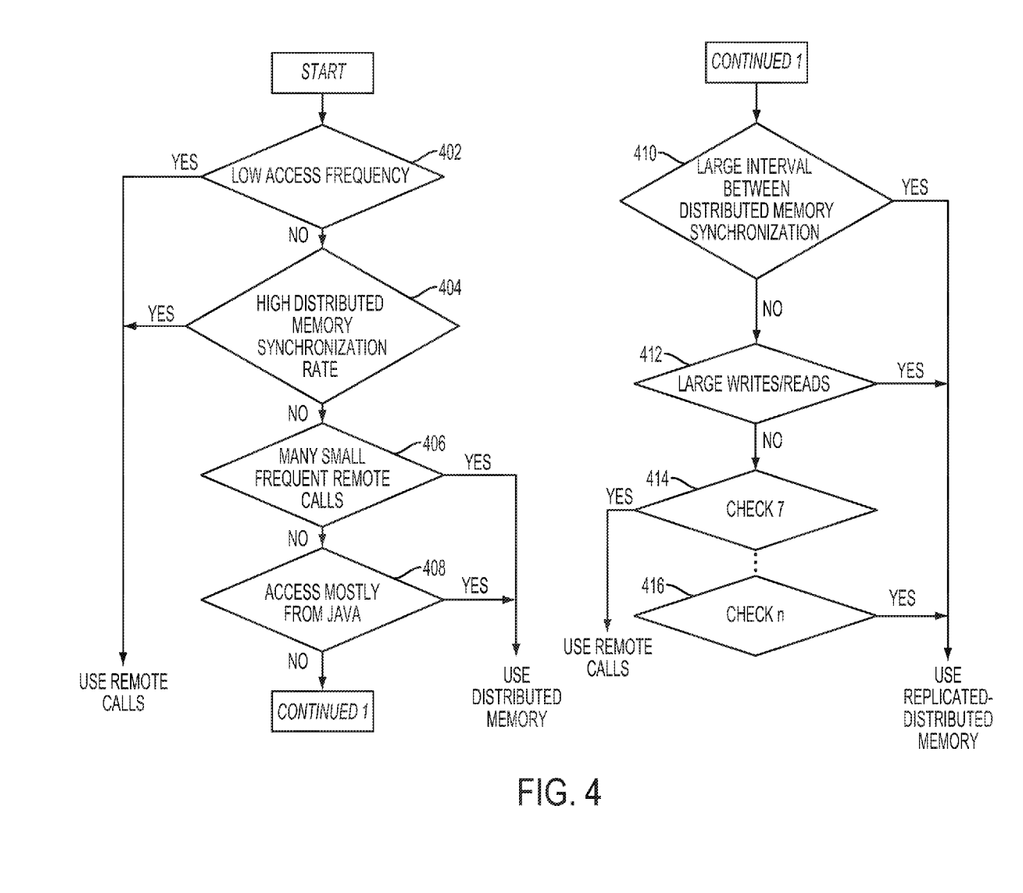
FIG. 4 is a flow diagram illustrating a method of identifying an optimal DBB management method in one embodiment of the present disclosure.

FIG. 4 is a flow diagram illustrating a method of identifying an optimal DBB management method (e.g., shown at 108 in FIG. 1) in one embodiment of the present disclosure. At 402, if it is determined that there is low access frequency, the remote call method is selected as being optimal. Otherwise, at 404, if it is determined that there is high distributed memory synchronization rate, the remote call method is selected. If not, at 406, if is determined that there are many small frequent remote calls, the replicated-distributed memory method is selected. At 408, if it is determined that the buffer access calls are mostly from the Java side (e.g., based on a threshold ratio or the like), the replicated-distributed memory method is selected. At 410, if it is determined that there is a large interval between distributed memory synchronization, the replicated-distributed memory method is selected. At 412, if it is determined that the size of access (e.g., write and/or read) is large, the replicated-distributed memory method is selected. As shown at 414 and 416, additional checks may determine whether to select a remote call method or a distributed memory method.

A methodology in one embodiment may allow for fast access to native buffers shared between separate nodes by using two virtual addresses for a given buffer and managing the buffer accesses from both sides. An on-demand transfer of the buffer from one side to another may be implemented by leveraging memory protection and controlling in buffer. A fallback remote access method may be provided that keeps the buffer on one side and re-directs all access to the buffer from the other side to the buffer. A method to capture statistics on access to the buffer on both sides may include capturing the size of the buffer, its sharing, access granularity, access interleaving, and other information. A method further may be provided to use the access statistics to select the on-demand transfer or the remote access methods.

Figure 7:
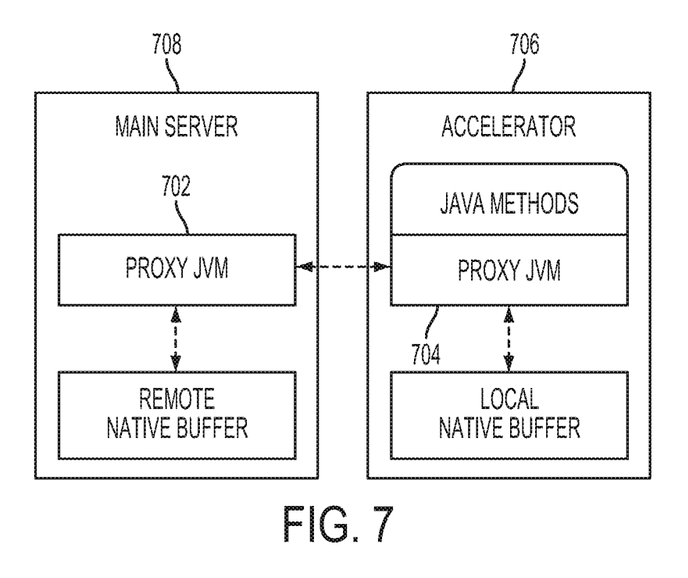
FIG. 7 illustrates hybrid system components in one embodiment of the present disclosure.

FIG. 7 illustrates hybrid system components in one embodiment of the present disclosure. A JVM Proxy 702, 704 can accelerate Java applications on hybrid systems by running a proxy JVM 704 on a separate accelerator 706 or another like hardware. In this configuration, all Java methods run on the accelerator 706 and native methods run on the original machine 708 by default. Buffers 710, 712 may be accessed via the proxies 702, 704 between the host server or machine 708 and the accelerator or like machine 706. In one embodiment of the present disclosure, a native buffer may be dynamically transferred between the main server 708 and the accelerator or the like machine 706 according to the methodology described above.

One or more components of the system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the hybrid computer system may include, but are not limited to, one or more processors or processing units, a system memory, and a bus that couples various system components including system memory to processor. The methodologies of the present disclosure may be implemented as a module that is executed on a processor that is a component of the hybrid computer system, may be programmed into integrated circuits of a processor, or loaded from memory, storage device, or network or combinations thereof.

The components of the hybrid system may include a variety of computer system readable media. Such media may be any available media that is accessible by computer system, and it may include both volatile and non-volatile media, removable and non-removable media. System memory can include computer system readable media in the form of volatile memory, such as random access memory (RAM) and/or cache memory or others. Computer system may further include other removable/non-removable, volatile/non-volatile computer system storage media. By way of example only, storage system can be provided for reading from and writing to a non-removable, non-volatile magnetic media (e.g., a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces.

The system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces.

Still yet, computer system can communicate with one or more networks such as a local area network (LAN), a general wide area network (WAN), and/or a public network (e.g., the Internet) via network adapter. As depicted, network adapter communicates with the other components of computer system via bus. Other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A non-transitory computer readable storage medium storing a program of instructions executable by a machine to perform a method of managing a buffer in a hybrid system, comprising:
- selecting a first buffer management method from a plurality of buffer management methods;
- capturing statistics associated with access to the buffer in the hybrid system running under the first buffer management method;
- analyzing the captured statistics;
- identifying a second buffer management method based on the analyzed captured statistics;
- determining whether the second buffer management method is more optimal than the first buffer management method;
- in response to determining that the second buffer management method is more optimal than the first buffer management method, invoking the second buffer management method; and
- repeating the capturing, the analyzing, the identifying and the determining,
- wherein at least one of the plurality of buffer management methods comprises reserving a region of free address space at a same or different virtual address in each of nodes of the hybrid system, and responsive to receiving a request for a new native buffer from a node of the hybrid system, allocating the new native buffer on the node and marking the virtual address of each of other nodes of the hybrid system with a guard page wherein the guard page provides an alarm for memory page access to the virtual address.

2. The non-transitory computer readable storage medium of claim 1, wherein the plurality of buffer management methods comprises a remote call method and a replicated-distributed memory method.

3. The non-transitory computer readable storage medium of claim 2, wherein the replicated-distributed memory method comprises dynamically transferring the buffer from one processor of the hybrid system to another processor of the hybrid system.

4. The non-transitory computer readable storage medium of claim 1, where a signal generated by an access to the guard page at one of said other nodes triggers migration of the new native buffer to said other node.

5. The non-transitory computer readable storage medium claim 4, wherein the signal generated by the access to the guard page triggers marking the new native buffer on said node as guarded.

6. The non-transitory computer readable storage medium of claim 1, wherein the selecting a first buffer management method comprises:
- analyzing buffer access characteristics associated with the buffer;
- analyzing environment characteristics of the hybrid system while the buffer is accessed; and
- selecting the first buffer management method based on the analyzed buffer access characteristics and the environment characteristics.

7. The non-transitory computer readable storage medium of claim 1, wherein the capturing of access statistics comprises recording latency associated with a plurality of calls to access the buffer, recording size of data for each of the plurality of calls, and keeping count of the plurality of calls.

8. The non-transitory computer readable storage medium of claim 1, wherein the capturing of access statistics comprises counting number of times the buffer is synchronized, recording interval and frequency of the synchronization, and tracking amount of time a copy of the buffer is allocated on a processor of the hybrid system.

9. The non-transitory computer readable storage medium of claim 1, wherein a distributed memory buffer management method is selected if one or more of the following criteria are met: frequent remote calls, interval between distributed memory synchronization exceeds a threshold interval.

10. The non-transitory computer readable storage medium of claim 1, wherein a remote calls memory buffer management method is selected if one or more of the following criteria are met: low access frequency, high distributed memory synchronization rate, frequent remote calls.

11. A system managing a memory buffer, comprising:
- a hybrid system comprising at least a first machine running a native code and a second machine running a managed code; and
- a module operable to run on the hybrid system and further operable to select a first buffer management method from a plurality of buffer management methods, capture statistics associated with access to the buffer in the hybrid system running under the first buffer management method, analyze the captured statistics, identify a second buffer management method based on the analyzed captured statistics, and determine whether the second buffer management method is more optimal than the first buffer management method, the module further operable, in response to determining that the second buffer management method is more optimal than the first buffer management method, to invoke the second buffer management method,
- wherein at least one of the plurality of buffer management methods comprises reserving a region of free address space at a same or different virtual address in each of nodes of the hybrid system, and responsive to receiving a request for a new native buffer from a node of the hybrid system, allocating the new native buffer on the node and marking the virtual address of each of other nodes of the hybrid system with a guard page wherein the guard page provides an alarm for memory page access to the virtual address.

12. The system of claim 11, wherein the plurality of buffer management methods comprises a remote call method and a replicated-distributed memory method.

13. The system of claim 12, wherein the replicated-distributed memory method comprises dynamically transferring the buffer from one processor of the hybrid system to another processor of the hybrid system.

14. The system of claim 11, wherein a signal generated by an access to the guard page at one of said other nodes triggers migration of the new native buffer to said other node.

15. The system of claim 14, wherein the signal generated by the access to the guard page triggers marking the new native buffer on said node as guarded.

* * * * *